United States Patent [19]
Richter et al.

[11] Patent Number: 5,982,567
[45] Date of Patent: Nov. 9, 1999

[54] MAGNETIC RECORDING APPARATUS WITH MAGNETIC RECORDING MEDIUM HAVING HIGH RECORDING DENSITY

[75] Inventors: Hans Jürgen Richter, Heidelberg; Werner Lenz, Bad Dürkheim; Ronald John Veitch, Maxdorf, all of Germany

[73] Assignee: EMTEC Magnetics GmbH, Ludwigshafen, Germany

[21] Appl. No.: 08/892,429

[22] Filed: Jul. 14, 1997

Related U.S. Application Data

[62] Division of application No. 08/624,246, Mar. 2, 1996, abandoned.

[30] Foreign Application Priority Data

Mar. 31, 1995 [DE] Germany .......................... 195 11 876

[51] Int. Cl.[6] ....................................................... G11B 5/02
[52] U.S. Cl. ............................ 360/25; 360/131; 428/65.3
[58] Field of Search .................................. 360/31, 46, 25, 360/65, 67, 68, 131; 428/323, 65.3, 64.2

[56] References Cited

U.S. PATENT DOCUMENTS

| | | | |
|---|---|---|---|
| 3,621,148 | 11/1971 | Johnson | 360/25 |
| 5,487,954 | 1/1996 | Chin et al. | 428/694 B |
| 5,494,732 | 2/1996 | Ito et al. | 428/212 |
| 5,496,607 | 3/1996 | Inaba et al. | 428/65.3 |
| 5,503,911 | 4/1996 | Aoki et al. | 428/213 |
| 5,512,363 | 4/1996 | Goto et al. | 428/323 |
| 5,525,404 | 6/1996 | Hatanaka et al. | 428/212 |

*Primary Examiner*—Andrew L. Sniezek
*Attorney, Agent, or Firm*—Keil & Weinkauf

[57] ABSTRACT

A longitudinally oriented magnetic recording medium is described which has advantageous properties for digital recording, ie. a very small pulse width and high output level, and wherein the quotient $l_r/(d \cdot L)$ ($l_r$=residual polarization in mT, d=layer thickness in $\mu$m, L=mean particle length in nm) is greater than 18 and the pulse width stated as $PW_{50}$ is smaller than 500 nm.

2 Claims, 2 Drawing Sheets

MAGNETIC RECORDING APPARATUS WITH MAGNETIC RECORDING MEDIUM HAVING HIGH RECORDING DENSITY

CROSS REFERENCE TO RELATED APPLICATIONS

This is a divisional of application Ser. No. 08/624,246 filed Mar. 29, 1996, now abandoned. RICHTER et al., Ser. No. 08/892,429

FIELD AND BACKGROUND OF THE INVENTION

The present invention relates to an essentially longitudinally oriented magnetic recording medium which has a very small layer thickness and is suitable for high-density recording.

Recently, the recording wavelength has been steadily decreased in order to satisfy the need for increased recording density for magnetic recording media. For example, the recording wavelength for the 8 mm video system is 0.58 $\mu$m. This gives rise to the problem of a loss of thickness in signal playback, ie. the playback level does not increase linearly as a function of increasing layer thickness but exhibits a saturation effect. Thus, only a very thin layer is required for short wavelengths.

In order to meet this requirement, magnetic recording media in which a binder-free ferromagnetic metal layer was applied in a very small thickness by means of a vacuum method were developed in the past 10 years. Although these metal evaporated recording media have a small thickness loss and achieve a very high playback level, the mass production of such tapes still gives rise to considerable difficulties in comparison with magnetic recording media in which the magnetic pigments are dispersed in binders. Moreover, these ME tapes change under the influence of atmospheric oxygen.

However, it has recently been possible to meet the requirement for a small layer thickness also by means of a thin magnetic layer in which the finely divided magnetic particles are dispersed in polymeric binder and this layer is cast on a non-magnetic substrate.

Such application methods are described, for example, in U.S. Pat. No. 2,819,186, German Laid-Open Application DE-A 4,302,516, EP 0 520 155, EP 0 566 100 and the German Applications P 44 43 896 and P 195 04 930.

Magnetic recording with high recording density is now predominantly carried out by a digital method. This means that, in contrast to the analog video recording, no sinusoidal signals are recorded and instead the information is recorded on the recording medium by switching over the direction of the current of the recording head. The magnetization pattern produced in such a switching process is referred to as the magnetization transition. However, this transition does not occur abruptly but more or less gradually, for example in the form of a Gauss curve. The playback signal of such a magnetization transition is pulse-like because inductive reading, which is typically used in the video system, is based on differentiation. Since the magnetization transition as described above does not occur abruptly, the read pulses have a certain width, which is usually defined by the $PW_{50}$ value. This value indicates the distance on the recording medium between the two points at which the actual signal assumes precisely 50% of the maximum value, as shown in FIG. 1. It is clear that highdensity recording requires very small pulse widths. At the same time, a very large pulse magnitude must be ensured in order to achieve an adequate output level.

DESCRIPTION OF THE INVENTION

Figure 1:
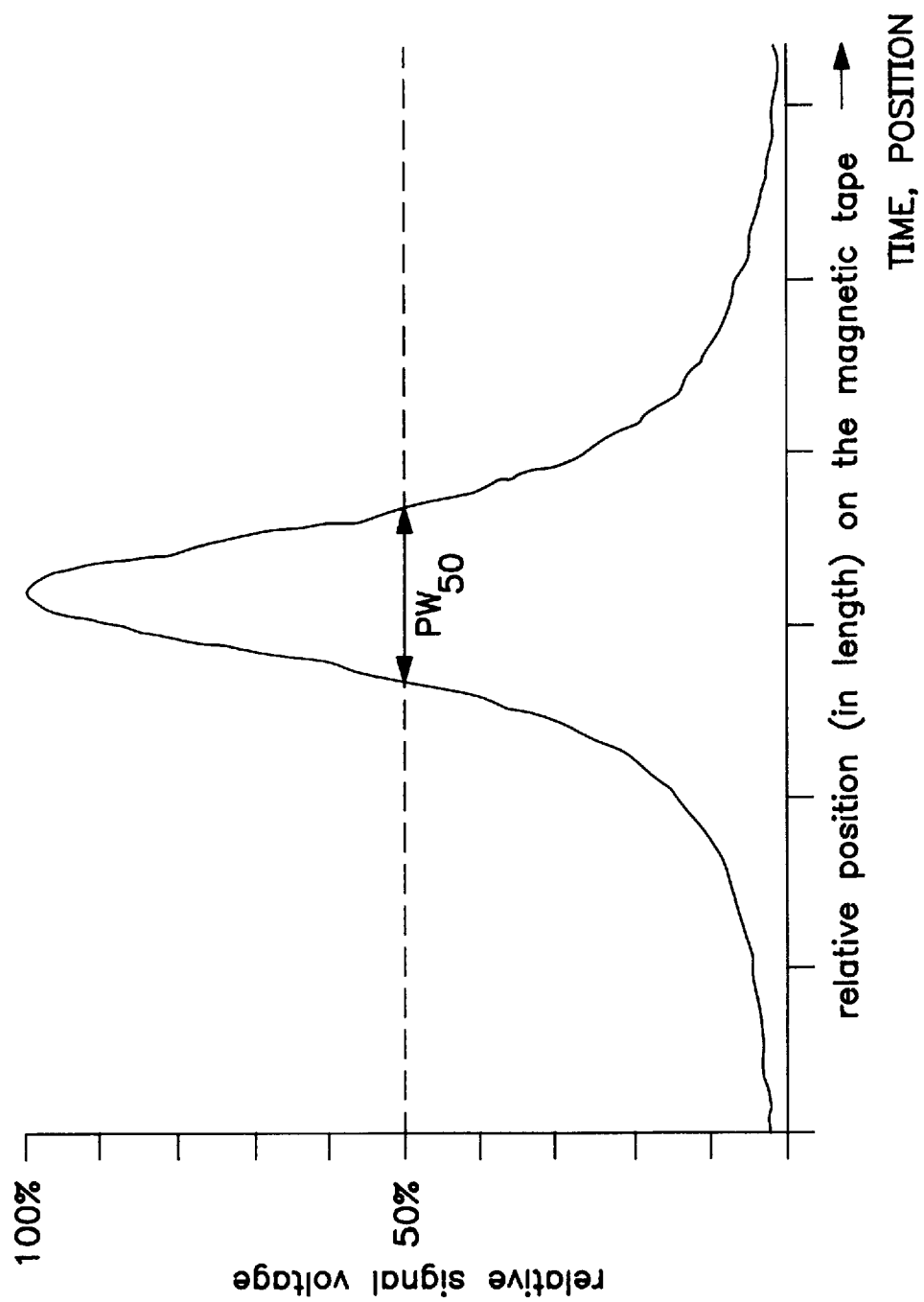
FIG. 1 depicts the $PW_{50}$ value of a read pulse.
Figure 2:
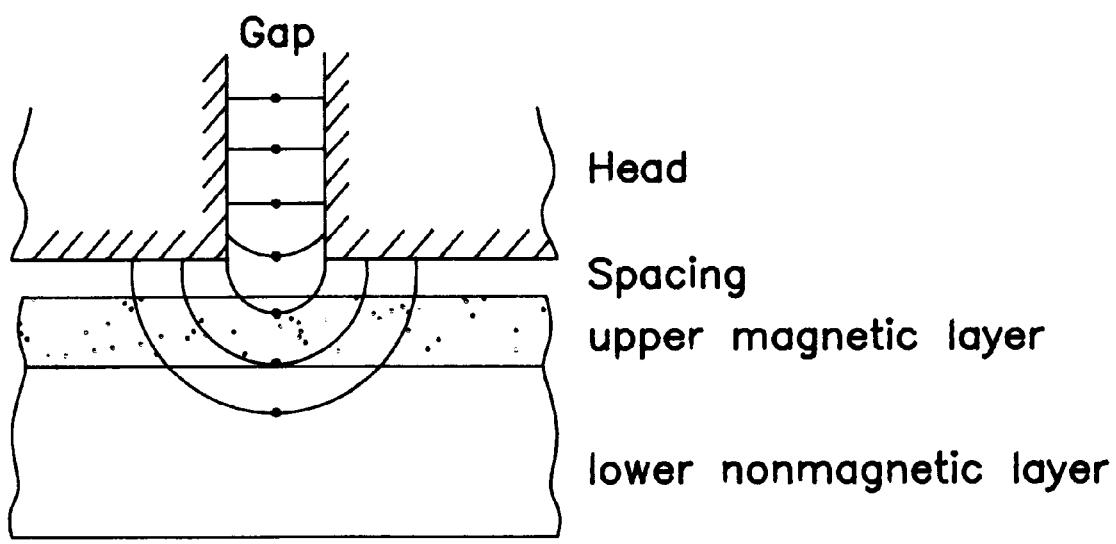
FIG. 2 schematically depicts the claimed apparatus.

It is an object of the present invention to provide a magnetic recording medium of the generic type stated at the outset which meets the abovementioned requirements.

We have found that this object is achieved, according to the invention, by a recording medium in which the quotient $l_r/(d \cdot L)$ is greater than 18.

Where $l_r$=residual polarization in mT d=thickness of the magnetic layer (in $\mu$m) and L=mean length of the magnetic particles.

In addition, the pulse width $PW_{50}$ should be less than 500 nm. The invention is illustrated below.

The measured values were obtained using an experimental setup under the following conditions:

Relative head/tape speed: v=3.17 m/s Read/write head: V8 type, measured gap zero point $g_w$=236 nm The recording current was adjusted so that the level of the fundamental wave of the square-wave signal is a maximum in square wave recording at a wavelength $\lambda$=3 $g_w$=708 nm, ie. 3 times the measured head gap width. The measurement was carried out using a spectrum analyzer (resolution bandwidth 30 kHz). If this condition is varied, for example by reducing the recording current by 20–30%, the differences between novel recording medium and comparison remain or become even larger.

A square-wave signal having a frequency of 96 kHz was recorded on the tape. The signal was then read by means of the read head and was scanned with a digitizer. The scanning rate was 5 ns. A single pulse was calculated from the scan signal, said pulse being obtained by averaging the centered read pulses. A total of 126 pulses were averaged. The pulse width is calculated from the single pulse measurement as above by determining the distance on the tape between the two points at which the read amplitude is precisely 50% of the maximum read signal, once again reference being made to the figure.

The residual polarization $l_r$ is defined as the magnetic moment divided by the sample volume. It is measured using a commercial magnetometer.

There are in principle no restrictions to the composition of the magnetic recording medium, preferably consisting of the layer containing the magnetic pigments and a nonmagnetic substrate.

The prior art magnetic pigments, such as iron oxide, Co-doped iron oxides, metal pigments and metal alloys, chromium dioxide and others, may be used, as may the conventional polymeric binders or binder mixtures and the other additives, such as dispersants, nonmagnetic pigments, lubricants, curing agents, wetting agents and solvents.

Suitable components of the magnetic layer and of the nonmagnetic layer are described, for example, in DE-A 43 02 516.

Known films of polyesters, such as polyethylene terephthalate or polyethylene naphthalate, and polyolefins, cellulose triacetate, polycarbonates, polyamides, polyimides, polyamidoimides, polysulfones, aramids or aromatic polyamides, serve as substrates. The substrate may be subjected beforehand to a corona discharge treatment, a plasma treatment, a slight adhesion treatment, a heat treatment, a dust removal treatment or the like. In order to achieve the object of the invention, the nonmagnetic substrate is one having a center line average surface roughness of in general 0.03 µm or less, preferably of 0.02 µm or less, in particular of 0.01 µm or less. It is also desirable for the substrate not only to have such slight center line average surface roughness but also to have no large protuberances of 1 µm or more. The roughness profile of the surface of the substrate can, if desired, be freely controlled according to the size and amount of the filler to be added to the substrate. Examples of suitable fillers are oxides and carbonates of Ca, Si and Ti and fine organic powders of acrylic substances.

The process for the preparation of the magnetic dispersion comprises at least one kneading stage, one dispersing stage and, if required, one mixing stage, which may be provided before and after the preceding stages. Particular stages may each comprise two or more stages. In the preparation of the composition, all starting materials, ie. the ferromagnetic powder, the binder, the carbon black, the abrasive, the antistatic agent, the lubricant and the solvent, may be added to the reactor immediately at the beginning of the process or subsequently in the course of the process. The individual starting materials may be divided into a plurality of portions, which are added to the process in two or more stages. For example, the polyurethane is divided into a plurality of portions and is added in the kneading stage and in the dispersing stage and also in the mixing stage for adjusting the viscosity after dispersing.

In order to achieve the object of the present invention, a known conventional technology may also be used as part of the process for the production of the novel magnetic recording medium. For example, a kneading apparatus having a high kneading force, for example a continuous kneader or a pressure kneader, may be used in the kneading stage in order to obtain a novel magnetic recording medium having a high Br value. If such a continuous kneader or pressure kneader is used, the ferromagnetic powder is kneaded with the total binder, preferably 30% by weight or more. For example, 100 parts by weight of a ferromagnetic powder are mixed with from 15 to 500 parts by weight of a binder.

After fine filtration through a narrow-mesh filter having a mesh size of not more than 5 µm, the dispersions are applied by means of a conventional coating apparatus at speeds in the usual range of 100–500 m/min, oriented in the recording direction in a magnetic field and then dried and subjected to calendering and, if required, a further surface-smoothing treatment.

Essentially longitudinally oriented is intended to mean the magnetic particles are present oriented essentially in the plane of the layer in the recording direction, but may also be oriented inclined at an angle up to 25° to the plane of the layer.

The coating may be effected by means of a doctor blade coater, a knife coater, a doctor, an extrusion coater, a reverse roll coater or a combination. The two layers can preferably be applied simultaneously by the wet-on-wet method.

The magnetic recording medium thus obtained is then slit longitudinally or punched into the usual width for use and subjected to the conventional electroacoustic tests and the mechanical tests.

Particularly advantageous results are obtained when a very thin magnetic upper layer whose thickness is less than 1 µm is cast on a nonmagnetic lower layer whose layer thickness is 1–8 µm.

The invention is illustrated with reference to practical examples and comparative examples, but without restricting the invention to the specific formulation examples and the apparatus for the production of such a magnetic recording medium. A magnetic recording medium consisting of a thin magnetic upper layer which was cast on a nonmagnetic lower layer was produced by means of an apparatus as described in more detail in German Application P 195 04 930. The two layers are based on the following formulation:

| a) Composition of the lower layer | Parts by weight |
|---|---|
| Vinyl polymer having polar groups | 85 |
| Polyurethane having polar groups | 85 |
| $TiO_2$ (55 $m^2/g$ BET) | 1000 |
| Lubricant | 25 |
| Polyisocyanate | 30 |
| Solvents (tetrahydrofuran, dioxane) | 2209 |

The viscosity of this lower layer is 50 mPa.s and the flow limit is 18 Pa.

| b) Composition of the upper layer | Parts by weight |
|---|---|
| Magnetizable metal pigment | 1000 |
| $\alpha$-$Al_2O_3$ (particle size = 0.2 µm) | 70 |
| Vinyl polymer having polar groups | 77 |
| Polyurethane having polar groups | 77 |
| Phosphoric ester | 10 |
| Lubricant | 25 |
| Polyisocyanate | 22.5 |
| Solvents (tetrahydrofuran, dioxane) | 6170 |

The viscosity of this upper layer is 8 mPa.s and the flow limit is 2.5 Pa.

The measurement of the viscosity and of the flow limit was carried out using a Carri-Med CSL Rheometer in the plate-and-cone measuring system at 25° C., and the evaluation was effected according to Bingham (descending curve).

TABLE 1

| Example | $H_c$ [kA/m] | $M_s$ [kA/m] | S = $M_r/M_s$ | d [µm] | SFD | Mean particle length [nm] |
|---|---|---|---|---|---|---|
| 1 (Comparison) | 144 | 326 | 0.89 | 1.5 | 0.27 | 105 |
| 2 (Comparison) | 148 | 326 | 0.83 | 0.2 | 0.28 | 105 |
| 3 (Comparison) | 181 | 363 | 0.9 | 1.2 | 0.3 | 80 |
| 4 | 187 | 334 | 0.87 | 0.17 | 0.31 | 80 |
| 5 | 183 | 346 | 0.84 | 0.14 | 0.3 | 80 |
| 6 | 182 | 336 | 0.83 | 0.13 | 0.31 | 80 |
| Fuji SDC (Comp.) | 133 | 280 | 0.88 | 0.4 | 0.3 | 150 |

Table 1 shows the magnetic and mechanical data of the magnetic recording media obtained using different magnetic pigments, which are shown in the Table. d in µm is the dry layer thickness of the upper layer, and the mean particle length (in nanometer) of the magnetic particles after volume averaging is shown in the last column. The particle size was measured under the electron microscope at 100,000 times magnification. A magnetic recording medium which has the name Fuji SDC and is available on the market for Hi-8 recording is also included as a comparison.

Table 2 below shows the results which were obtained with the various magnetic recording media with respect to
  pulse width $PW_{50}$ in nm
  the ratio of $l_r/(d \cdot L)$
    where $l_r$ is the residual polarization in mT,
d is the thickness of the magnetic layer in μm and
L is the mean particle length of the magnetic pigments in nm.

TABLE 2

| Example | PW$_{50}$ (nm) | $l_r$/(d · L) (nT/μm/nm) |
|---|---|---|
| 1 (Comparison) | 682 | 2.3 |
| 2 (Comparison) | 586 | 16.2 |
| 3 (Comparison) | 625 | 4.3 |
| 4 | 460 | 28.8 |
| 5 | 401 | 32.6 |
| 6 | 389 | 33.7 |
| Fuji SDC (Comp.) | 625 | 5.2 |

It is evident that the novel recording media have a very small pulse width PW$_{50}$, ie. smaller than 500 nm, and at the same time a high quotient $l_r$/(d·L), ie. greater than 18.

We claim:

1. A magnetic recording apparatus intended for high-density recording, comprising a magnetic head and a magnetic recording medium, wherein the magnetic head has a recording current, the magnetic head comprises a first pole and a second pole separated by a distance defining a head gap width, the magnetic recording medium comprises magnetic pigments oriented essentially in a longitudinal direction, the magnetic recording medium further comprises a magnetic upper layer and a non-magnetic lower layer, the magnetic recording medium has a pulse width wherein the recording current in the case of square-wave recording at a wavelength corresponding to three times the head gap width is the maximum level of the fundamental wave of the square-wave function, and $l_r$/(d·L) is greater than 18, where $l_r$ is the residual polarization, measured in mT, d is the thickness of the magnetic layer, measured in μm, and L is the mean particle length of the magnetic pigments, measured in nm.

2. The magnetic recording apparatus of claim 1, wherein the pulse width PW$_{50}$ is less than 500 nm.

* * * * *